(12) United States Patent
Boast

(10) Patent No.: US 6,313,552 B1
(45) Date of Patent: Nov. 6, 2001

(54) COAXIAL LINEAR MOTOR FOR EXTENDED TRAVEL

(75) Inventor: Gerard Sean Boast, Westcliffe On Sea (GB)

(73) Assignee: Linear Drives Limited, Basildon (GB)

( * ) Notice: Subject to any disclaimer, the term of this patent is extended or adjusted under 35 U.S.C. 154(b) by 0 days.

(21) Appl. No.: 09/444,807

(22) Filed: Nov. 22, 1999

(30) Foreign Application Priority Data

Nov. 23, 1998 (GB) .................................................. 9825649

(51) Int. Cl.$^7$ .................................................. H02K 41/00
(52) U.S. Cl. ............................................................. 310/14
(58) Field of Search ................................. 310/12, 13, 14; 318/135; 335/249, 250, 262, 263, 281; 336/178, 196, 225

(56) References Cited

U.S. PATENT DOCUMENTS 6,040,642 * 3/2000 Ishiyama ................................. 310/12
6,060,798 * 5/2000 Souris ..................................... 310/14

* cited by examiner

*Primary Examiner*—Nestor Ramirez
*Assistant Examiner*—Judson H. Jones
(74) *Attorney, Agent, or Firm*—Harness, Dickey & Pierce, P.L.C.

(57) ABSTRACT

A multiphase linear motor has an elongated stator with a stack of permanent magnets end-to-end along its length and a coaxial drive coil configuration which is such as to leave a gap permitting mechanical support of the permanent magnets at least at intervals along the length of the stator intermediate its ends. Specifically the drive coils comprise sub-coils with arcuate turns which subtend less than 360° around the motor axis to leave free a gap for the aforementioned mechanical support.

10 Claims, 4 Drawing Sheets

Fig.2(a).
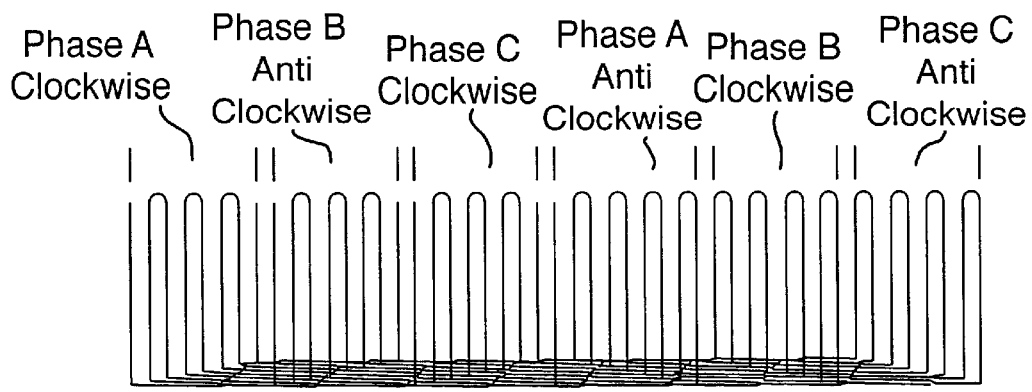
Fig.2(b). Fig.2(c).
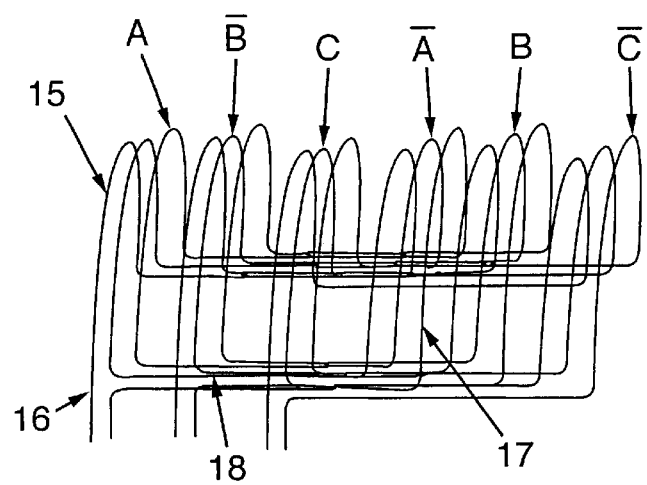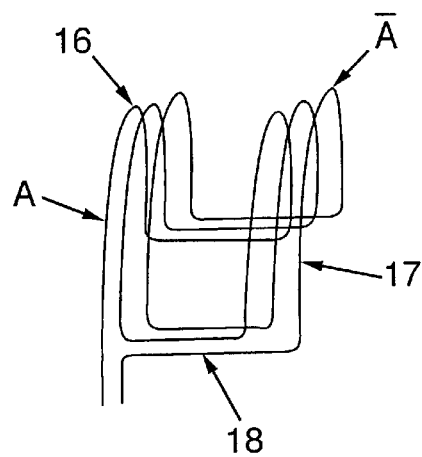
Fig.2(d).
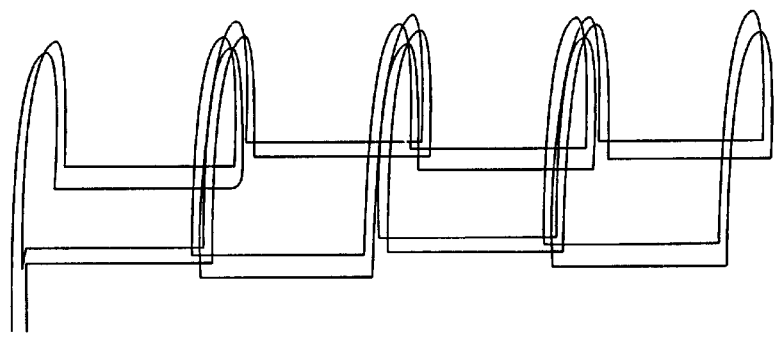

COAXIAL LINEAR MOTOR FOR EXTENDED TRAVEL

The following invention relates to permanent magnet linear electric motors, in particular those used for applications requiring extended travel.

Numerous types of linear motor exist for effecting powered travel over extended distances. Examples are a) the AC linear induction motor, b) the 'sandwiched coil' construction permanent magnet linear motor, and c) dc brushless motors of various configurations. Each of these examples suffers from various deficiencies. In the case of the AC induction motor, there are substantial electromagnetic and resistive losses inherent in both its construction and mode of operation, and the maximum velocity of movement is limited by factors such as the frequency of the AC supply used, and the practical limitations on the effective pole pitch of the armature coils. In addition, for systems in which the stator is used as the moving part, armature coils are required over the full length of travel, which is both expensive, and wasteful of energy. In the case of sandwich type constructions, in which the motor's armature coils are located between two facing rows of magnets, it is self evident that heat cannot escape conveniently from the said coils. The ability to dissipate heat is a key measure of the effectiveness of any linear motor design. In the case of flat dc brushless motors, these necessitate the use of a copious volume of permanent magnet material along their entire length, and are therefore expensive. Furthermore, the ways must be flat, and in many designs a very tight air gap must be maintained.

An ideal design is one in which a) a relatively limited volume of permanent magnet material is needed per unit length of travel, b) there is no need for a critical airgap between the stator and armature, and c) heat generated by the travelling armature coils can easily be dissipated. Such a motor, now in widespread use, is described in UK granted patent no. 2079068. Although a successful commercial design, an inherent disadvantage of this tubular type of construction, is however, the limited travel that may be realised. This is due to the tendency of the stator to bow under the effect of gravity, and thereby come into contact with the moving coils of the armature, which coaxially surround it. Travel is therefore limited, in practice, to no more than two metres. An ideal motor is one which combines the inherent advantages of the aforementioned invention, with the ability to travel extended distances.

According to the present invention, there is provided a linear motor comprising an armature and a stator coaxial with one another, the stator having a plurality of magnetic flux generators extending along the longitudinal axis of the motor over the required travel of the armature relative to the stator and providing a repeating sequence of magnetic poles along said axis, the armature having a plurality of phases of drive coils coaxial with the stator for providing, when appropriately commutated, thrust, the coils being wound such that they substantially surround the stator but leave a single gap extending transversely of the longitudinal axis of the motor to allow the presence of means, extending radially through the gap, for the mechanical support of the stator.

This gap means that unlike prior linear motors using coaxial drive coils, the stator and its flux generators are not restricted to being supported only at the opposite ends of the stator and can be supported at locations intermediate its ends and, indeed, over its entire length.

In the present motor, due to the coaxial arrangement of the drive coils, the thrust is produced by currents passing through the drive coils interacting with the lines of magneto motive force produced by the stator flux generators which are principally directed radially relative to the motor longitudinal axis. The parts of the coil conductors in which this thrust is generated are those which extend circumferentially around the motor longitudinal axis.

The requirement of the provision of the stator support gap is, on the face of it, in conflict with the winding of the armature coils from continuous electrical conductors (wire or tape) for this reason: the coil conductor cannot, because of the gap, extend 360° around the motor axis and must therefore after one part-turn (i.e. 360° minus a gap angle) turn back on itself around the motor axis. However, this would result in the current flow being in the opposite turning direction, cancelling out the thrust generated by the part-turn in question. In an embodiment of the invention, this problem is overcome as follows:

each coil is configured as two sub-coils which are spaced from one another longitudinally of the motor and have winding portions which extend clockwise and anticlockwise respectively round the axis of the motor;

these sub-coils are longitudinally spaced apart by a distance, chosen in relation to the spacings of the stator poles, such that they are subject to radial lines of force from the stator poles which are of opposite polarities. Thus, the current flows in the sub-coils, being of opposite clock senses, produce thrust forces in the same longitudinal direction.

In order to assist visualisation of the way in which the coil is wound, each "turn" of the coil winding is made up of the following contiguous portions:

starting at one side of the gap, a portion which extends in a circular arc, in a plane perpendicular to the motor axis, around the motor axis to the other side of the gap (this circular arc subtends less than 360° around the motor axis to leave the mechanical support gap);

from there, a portion which turns perpendicular to that plane, i.e. now parallel to the motor axis, along the length of the armature to the other sub-coil of the coil;

from there a portion corresponding to the first portion, extending circumferentially around the motor axis through an arc corresponding to the first-mentioned one but counterclockwise to the starting side of the gap;

finally, a portion extending parallel to the motor axis, clear of the gap, returning to the first sub-coil.

In the illustrated embodiment of the invention, the coils of the respective phases of the motor overlap one another longitudinally of the motor and, to allow for this, the portions of the conductors which extend between the two sub-coils are not exactly parallel to the motor axis but are shaped to allow the overlapping of the coils. In a preferred embodiment of the invention, the stator flux generators are arranged such that successive flux generators have their magnetic poles facing one another i.e. in a NS . . . SN . . . NS . . . SN . . . sequence. Further, the armature sub-coils are contiguously overlapped so that there are no longitudinal spaces left between sub-coils of respective phases of the motor. The stator flux generators are conveniently constituted by a stacked sequence of permanent magnets and intermediate spacers so as to provide the required NS . . . SN . . . NS . . . SN . . . sequence.

Thus, in this arrangement, because the armature coils do not circumscribe the stator of the motor, the stator may be mechanically supported along its full length, so enabling the provision of a motor of whatever length is required to meet a particular application. At the same time, the maximum possible flux linkage between the armature coils and the stator magnetic stack is achieved, by virtue of their coaxial alignment and operation. A tubular linear motor results, with a number of salient advantages, as follows.

Firstly, and most significantly, the electromagnetic efficiency of the motor arising from the manner in which flux squeezing occurs due to the disposition of the permanent magnets. (By way of explanation, because like poles are facing, virtually all of the magnetic energy stored within the permanent magnets is caused to emanate radially, for direct linking with the coils of the armature.) Secondly, because the coils are arranged contiguously, all of the length of the armature is occupied by copper, so optimising the number of turns working against the flux emanating from the stator. Thirdly, again arising from the favourable permanent magnet field pattern, there is no need for the use of iron laminations between successive coils, to enhance performance. The mass of the armature consequently is substantially only that of the windings and their housing, rather than that of windings and iron, and the resulting light armature provides a highly improved dynamic response for eg servo positioning. Fourthly, and importantly, because the coils surround the stator, heat can readily escape through the walls of the housing in which they are located. Fifthly, because the coaxial alignment of the coils relative to the stator may be determined by external precision guidance means (eg a precision recirculating ball linear bearing slide), a close air gap may be achieved between stator and armature, so further enhancing performance. Sixthly, as already mentioned above, there is no effective limit to the travel that may provided by a motor of this construction.

As will be appreciated, the essence of the invention herein disclosed is to provide a tubular linear motor, but in such a format that its stator can be supported along its full length. An inherent limitation arises from this construction, inasmuch that the individual turns of each sub-coil of any given phase, clearly cannot be completed circumferentially around the stator. Thus, each part turn, having been formed during winding to surround the stator as far as possible, (in order to maximise flux linkage), must then traverse along the length of one pole pitch of the armature, in order to form a part turn of the next sub-coil, and then traverse again back to the original coil to form a further part turn., and so on. It will be appreciated that the 'traversing portion' connecting each sub coil to the next must occupy space with that of its neighbour's interconnections, and this sharing of space must be optimised during production to provide a feasible solution.

According to an embodiment of the invention, the interconnections between sub coils of any given phase of the armature are so formed that the traversing portions interconnecting the sub coils are interleaved with the traversing portions interconnecting the sub coils of the other phase(s), the arrangement being such that the traversing portions of wire interconnecting the various subcoils share, substantially, the same cross sectional area. Thus, by this means, rather than there being bulges where the traversing portions cross one another, as they leave to form the turns of each sub coil, the individual turns may rise naturally from the traversing portions. This new arrangement both minimises I2R losses in the non-effective traversing portion of the coil, and also ensures as much 'turn' as possible coaxially surrounds the stator. The combination of these two factors helps realise as high efficiency as is possible from this design.

In a feature of this embodiment of the invention, the traversing portion of wire interconnecting the sub coils is arranged during manufacture of the armature to lie directly against the inside surface of the housing walls in which the coils are situated, so as to ensure the maximum dissipation of resistive heat losses through the housing walls.

The invention will now be described with reference to the accompanying drawings in which:

FIGS. 1 a, b, c & d are schematic representations of the stator of the motor.

FIGS. 2 a,b,c and d are schematic representations of the armature of the motor.

Figure 1A:
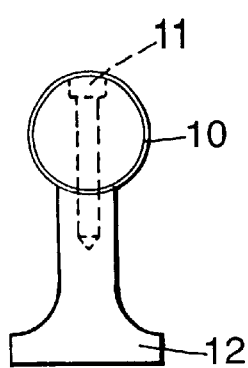
Figure 1B:
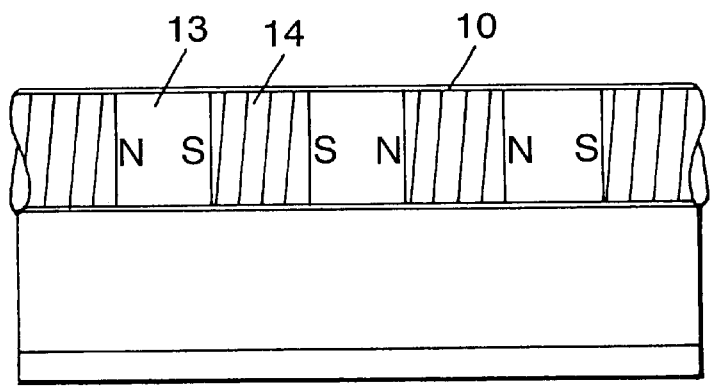
Figure 1C:
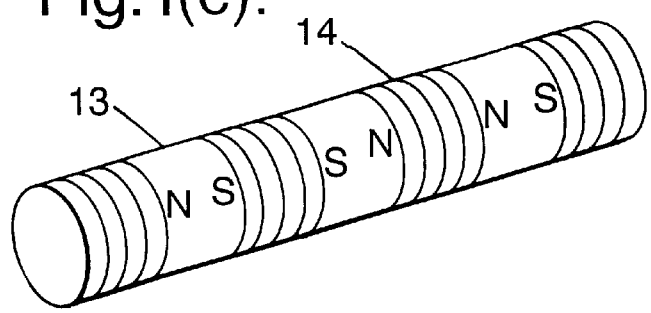
Figure 1D:
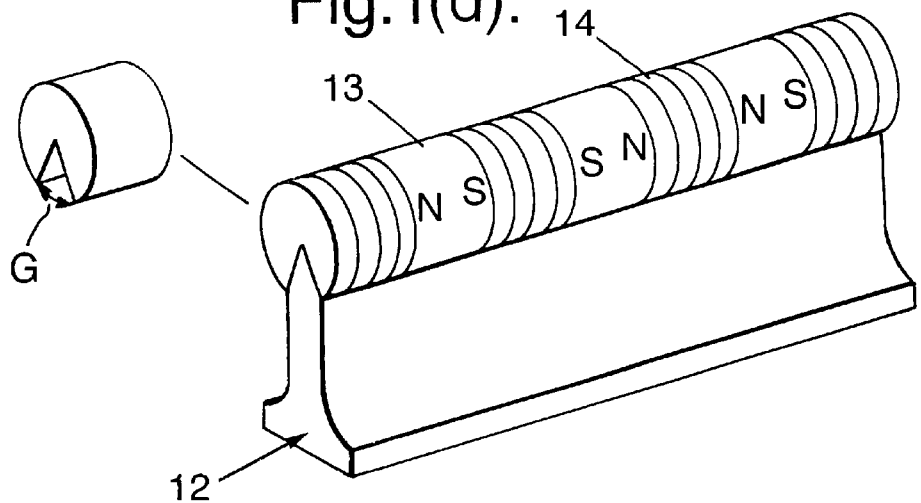

Referring now to FIG. 1, views of the stator of a linear motor as herein described are shown at a)-d). Referring now to FIG. 1a, a non-ferromagnetic tube 10 containing a sequence of permanent magnets, is mounted onto a proprietary type support stand, 12. The sequence of permanent magnets is as disclosed in UK granted patent 2,079,068, and is shown schematically in FIGS. 1, b & c. Each magnet, 13, is disc shaped in the particular design illustrated in FIGS. 1a–c, and is housed and maintained within the tube 10, as shown in FIG. 1b. (To suit mechanical mounting requirements, magnets and spacers of other cross sections may be employed, such as in the arrangement shown in FIG 1d, provided the magnetic sequence is maintained.) The magnets are each separated one from the other by spacers, 14. These may be of a suitable ferromagnetic material, to provide the maximum radial field. Like poles of each magnet face one another, in other words, they are stacked in a spaced NS . . . SN . . . NS . . . sequence. The diameter and width of the disc magnets is chosen to optimise the required performance/cost ratio for any given design. The stand 12 used to support the tube may be of any suitable commercial design, but preferably is not fabricated from ferromagnetic material which would otherwise provide a degree of magnetic short circuit to the magnetic flux radiated from the stator, and so limit the motor's efficiency. The upper portion of the stand extends through a cap G which extends the entire length of the motor armature so as to provide mechanical support for the stator magnets and their tubular housing.

Referring now to FIG. 2, a three phase coil 15 of the armature is shown pictorially at a) & b). Each coil comprises two circular portions, as shown at 16 & 17 in 2c. It is these circular portions which cut the lines of flux emanated from the stator, and thus produce linear force longitudinally of the motor. Each turn of each of the circular portions is connected, as shown, to the corresponding turn of its facing portion by the traversing portions of conductor, 18. Each set of two sub coils is interleaved with neighbouring coils to form a complete set, as shown at (b) and (a). It will be noted that the circumferential direction of current in phase A will be opposite to that of its mating coil, A, simply due to the current flow direction. This is as necessary to effect the correct magnetic polarity of each sub coil in correspondence to that which is created by the stator permanent magnet fields. Thus, when portion A overlies an area of the stator coinciding with the field emanating from—say—facing North poles of the stator, portion A overlies an area with facing South poles. This reversal of current direction, resulting from the method of winding and interconnecting the coils, thereby ensures a consistent direction of thrust is obtained from a set of energised sub coils, in accordance with Fleming's left hand rule, regardless of the position of the coils over the armature. Note, the coils do not necessarily have to be wound so as to form just two facing sub coils. Instead, where a particularly long armature is envisaged, a series of sub coils can be formed, in one continuous sequence, as shown in FIG. 2d. It is a feature of this arrangement, however, that because of the winding pattern, the very end sub coils do have one half of the number of turns of the intermediate sub coils.

Figure 3:
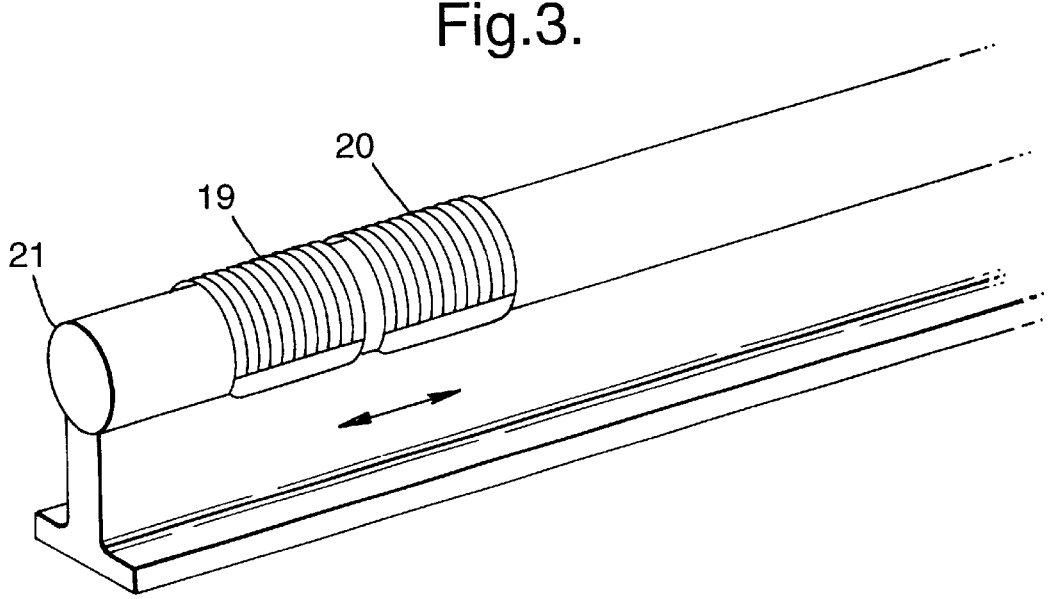
FIG. 3 shows a perspective view of the armature and stator together.

FIG. 3 shows a double set of armature coils, 19 and 20, positioned coaxially around a stator of the motor 21. It is readily apparent that many sets can be added to increase the thrust available for any specific application, or by the use of an extended series of sub coils as explained above.

Figure 4:
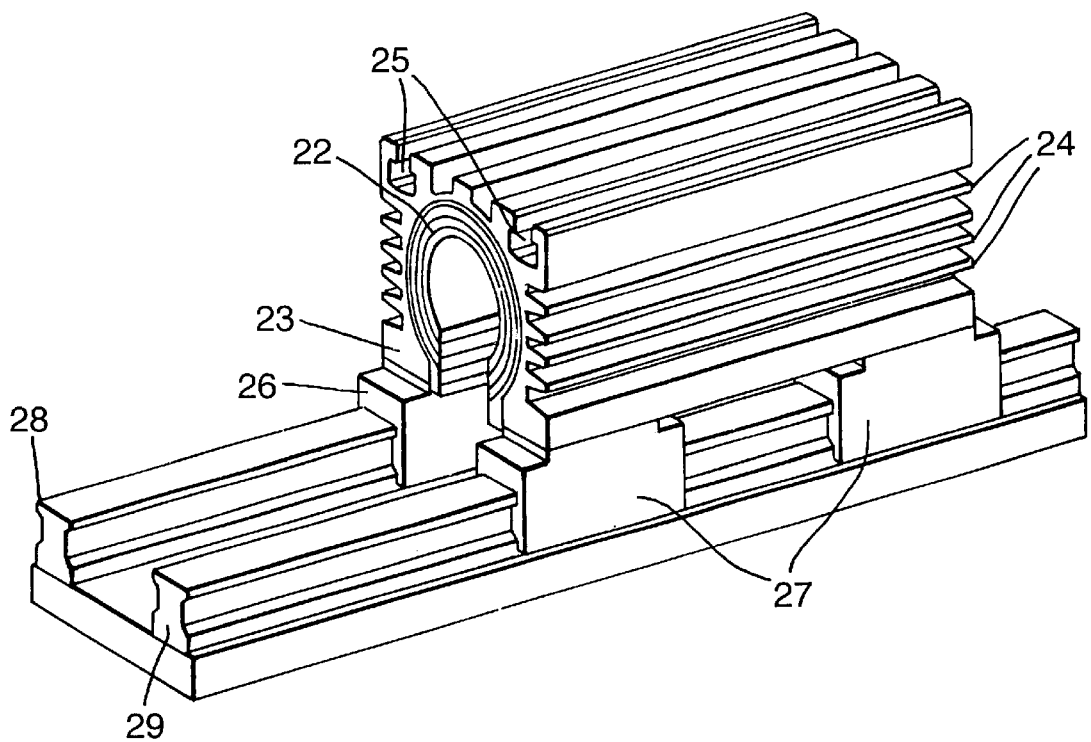
FIG. 4 shows the armature coils embedded within a heat-sinking housing, with linear bearings for guiding the passage of the housing relative to the stator.

A key advantage of this invention is the manner in which heat can be dissipated from the armature coils, owing to the fact that they are cylindrical, and surround the stator. FIG. 4 indicates how this is realised in practice. The armature coils 22 are sealed within a protective housing, 23, with external fins, 24. As well as providing a highly effective heat sink, the housing protects the coils physically, as well as ensuring that they are held in coaxial alignment. The load to be positioned by the linear motor may be clamped to the housing by means of the T slots, 25. To ensure a precise orientation of the armature housing relative to the stator, and accurate guidance as it traverses to and fro, a linear guidance system may be employed. This is shown at 26 and 27. Linear re-circulating ball bearing blocks are affixed to the base of the housing, and these are in turn guided along by the linear slides 28 and 29. In practice, such guides afford outstanding precision. A fine air gap may therefore be achieved between the inner diameter of the coils 24, and the outer diameter of the stator tube (not shown), so further enhancing the performance of the motor. It will be appreciated that this arrangement is shown by way of example only, there being many orientations and location possibilities for the linear guidance system.

Figure 5:
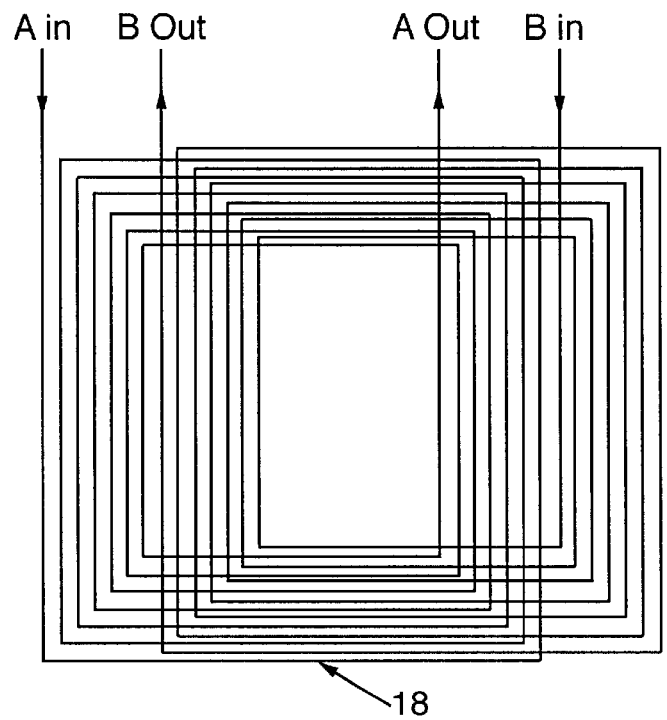
FIG. 5 shows in detail a winding arrangement of the coils of the motor.
Figure 5:
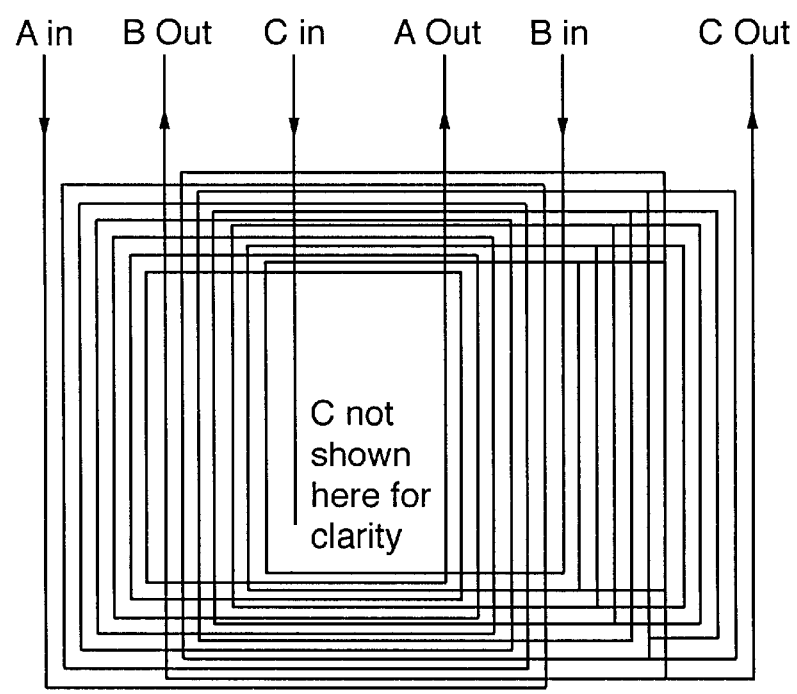

It will be apparent from a close inspection of the coil configurations of FIGS. 2a and 2b, that the longitudinally extending portions of traversing wire 18 interconnecting the various sub coils, must all share the same physical space. To optimise this procedure, and minimise the length of interconnecting wire, (and therefore ameliorate the parasitic $I^2R$ losses associated therewith), the coils of the motor are formed together during construction such that all of the traversing portions 18 of the various sub coils are interleaved or interlaced within the same effective cross-sectional area along the armature. Thus, referring to FIG. 5, it will be seen that the vertical portions of each coil (representing the circumferential portion of each coil), are—of course— separate, but that the traversing portions 18 are all interleaved. This provides a simple and elegant solution to the practical matter of winding the armature coil for as efficient operation as possible. Note, the third phase, phase C, is omitted for clarity.

Thus the illustrated arrangement provides a motor in which the winding of the armature coils and the dispersion of the longitudinally extending traversing portions 18 is such that the single gap G is left in the circumference of the armature, allowing the passage of the upper part of the support stand 12 into the interior of the coils where it can support the stator magnet assembly. At the same time, the arcuate portions of the armature drive coils substantially surround the stator permanent magnets apart from in the position of the gap G. The arc around the longitudinal axis of the motor occupied by the gap G is preferably not more than approximately 30°.

While the above discloses several possible realisations of the linear motor of the invention, numerous variations will be apparent to those skilled in the art.

What is claimed is:

1. A linear motor comprising an armature and a stator coaxial with one another, the stator having a plurality of magnetic flux generators extending along the longitudinal axis of the motor over the required travel of the armature relative to the stator and providing a repeating sequence of magnetic poles along said axis, the armature having a plurality of phases of drive coils coaxial with the stator for providing, when appropriately commutated, thrust, the coils being wound such that they substantially surround the stator but leave a single gap extending transversely of the longitudinal axis of the motor to allow the presence of means, extending radially through the gap, for the mechanical support of the stator.

2. A linear motor according to claim 1, wherein the flux generator of the stator is constituted by an end-to-end stack of permanent magnets.

3. A linear motor according to claim 1, wherein the magnetic poles of the stator flux generators are arranged in a spaced NS . . . SN . . . NS . . . SN . . . sequence.

4. A linear motor according to claim 1, wherein each armature coil comprises two sub-coils spaced from one another longitudinally of the motor, the sub-coils each comprising arcuate winding portions coaxial with the motor axis and subtending less than 360° around the motor axis so as not to obtrude into said gap, the sub-coils being electrically interconnected by longitudinal portions which run substantially parallel to the motor axis, also without obtruding into said gap.

5. A linear motor according to claim 4, wherein the sub-coils of each coil are spaced longitudinally of the motor such that when an electric current is passed serially through respective ones of the arcuate portions it flows clockwise through the arcuate portions of one sub-coil and anticlockwise through the other, and there interacts, to produce thrust force in the same longitudinal direction, with radial magnetic fields of opposite polarities produced by flux generators of the stator.

6. A linear motor according to claim 4, wherein, where they overlap with one another longitudinally of the armature, the longitudinal portions of the respective armature coils are interlaced with one another.

7. A linear motor according to claim 5, wherein the two sub-coils of each coil are dimensioned and spaced from one another and the drive coils are disposed relative to one another such that the longitudinal gap between sub-coils of one drive coil is filled with and occupied by sub-coils of the other drive coil(s).

8. A linear motor according to claim 1, wherein the stator flux generators are supported by means which extend continuously, longitudinally of the motor, through the support gap.

9. A linear motor according to claim 1 which is a three phase motor having coils for the three phases on the armature.

10. A linear motor according to claim 1, wherein the armature coils are wound such that and the longitudinal portions of the coils are disposed such that the gap occupies an arc not greater than approximately 30° of the circumference of the armature.

* * * * *